I. VAN TRUMP.
Fog Signal.
No. 61,643.
Patented Jan. 29, 1867.
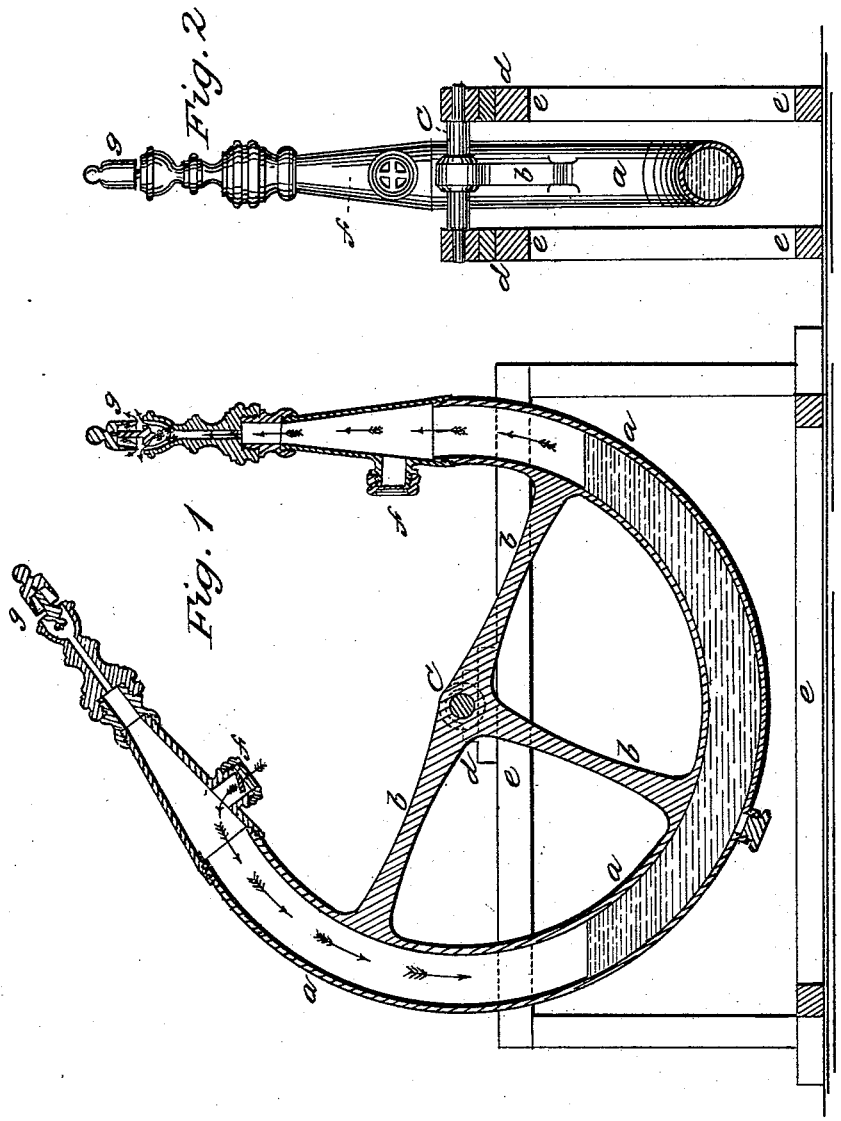
Witnesses:
Lemuel W. Serrell
Chas. H. Smith
Inventor:
I. Van Trump

United States Patent Office.

ISAAC VAN TRUMP, OF WILMINGTON, DELAWARE.

Letters Patent No. 61,643, dated January 29, 1867; antedated January 19, 1867.

IMPROVEMENT IN FOG SIGNALS.

The Schedule referred to in these Letters Patent and making part of the same.

TO ALL WHOM IT MAY CONCERN:

Be it known that I, ISAAC VAN TRUMP, of Wilmington, in the county of New Castle, and State of Delaware, have invented, made, and applied to use a certain new and useful Improvement in Signals, Calls, or Alarms; and I do hereby declare the following to be a full, clear, and exact description of the said invention, reference being had to the annexed drawing, making part of this specification, wherein—

Figure 1 is a section of my apparatus longitudinally; and
Figure 2 is a transverse section of the same.
Similar marks of reference indicate the same parts in both figures.

Whistles have heretofore been fitted to act by means of water in a pipe giving motion to the air as said pipe is moved by the rolling of a vessel in which such pipe is fitted. The nature of my said invention consists in a pipe or tube to contain water or other liquid, and hung upon centres or a rock-shaft, in combination with a suitable whistle or whistles, so that the apparatus can be operated by being swung by hand or other power on board of vessels, locomotives, steamboats, or under any circumstances where a signal, alarm, or call is required, a portion of the air between the surface of the water and the whistle being forced out of the whistle as the apparatus is swung one way, and drawn in as it is swung the other way, either through the whistle or a valve provided for that purpose opening inwards.

In the drawing, $a$ is a pipe of a curved shape, sustained by arms $b$ to the rock-shaft $c$, which rock-shaft sets in boxes or bearings $d$ on a frame, $e$, or in any other suitable support. $ff$ are air valves near the upper ends of the pipe $a$, fitted to open inwards and admit air, but closing easily when the air within is compressed. To operate on the air within the pipe $a$, I employ sufficient water or other liquid to fill the lower portion of the said pipe $a$, so that motion given to said pipe will cause the air to be blown out at or near the ends of said pipe, alternately, according to which way the pipe may be moved or oscillated, the air drawing in at one of the valves $f$, while it is forced out at the opposite end of the pipe $a$. At or near each end of the pipe $a$ I provide a whistle, $g$, that may be of any desired construction; I however prefer that it should be of the usual character of whistles adapted to use with steam, fitted with a cylindrical edge over an annular mouth, as shown. It will be understood that said apparatus being set upon the shaft $c$, and balanced nearly in any position, can be swung by hand with great facility, so that the whistles may be alternately blown for an alarm signal or call; and when a pipe is used with a valve and whistle, and located so that the waves can act within the pipe to expel or draw in the air, the same whistling will be produced, the air drawing in at the valve and being expelled through the whistle.

What I claim, and desire to secure by Letters Patent, is—

An air pipe or tube hung upon centres or a rock-shaft, in combination with a whistle or whistles, substantially as specified, so that water or other liquid contained in said tube or pipe shall cause air to pass through the whistle or whistles when the apparatus is moved as set forth.

In witness whereof I have hereunto set my signature this 25th day of January, 1865.

I. VAN TRUMP.

Witnesses:
LEMUEL W. SERRELL,
CHAS. H. SMITH.

*Assor to Marine Signal Co.